G. MORGAN.
Wind Elevator for Grain.

No. 83,782.

Patented Nov. 3, 1868.

G. MORGAN.
Wind Elevator for Grain.

Patented Nov. 3, 1868.

WITNESSES

INVENTOR

GERRY MORGAN, OF NEWPORT, NEW HAMPSHIRE.

Letters Patent No. 83,782, dated November 3, 1868.

IMPROVEMENT IN WIND-ELEVATORS OF GRAIN.

The Schedule referred to in these Letters Patent and making part of the same.

Be it known that I, GERRY MORGAN, of Newport, in the county of Sullivan, and State of New Hampshire, have invented a new and useful Improvement in the Wind-Elevator, for elevating and conveying grain and other substances from one place to any other desired place of deposit; and I do hereby declare that the following is a full, clear, and exact description thereof, reference being had to the accompanying drawings, and to the letters of reference marked thereon, making a part of this specification, in which—

The same letters of reference indicate identical parts in the different figures.

Hitherto, in wind-elevators, the grain has been introduced into the machine through the box containing the blower, and before its exit therefrom into the conveying-tube, has been more or less broken and injured by the fans of the blower in its rapid rotation.

My invention consists in supplying a device by which a strong current of air is drawn from the outside, through an aperture, into the elevating-tube, at a convenient point from the blower, carrying with it the grain, which I also feed into the tube through the same aperture, and which is also impelled by its own gravity, thus making the apparatus more effectual for the purposes for which it is designed, and saving the grain from the injury it receives in its passage into and through the blower, as in the wind-elevators hitherto constructed.

To enable others skilled in the art to make and use my said improvement, I proceed to describe its construction and operation.

Figure 1:
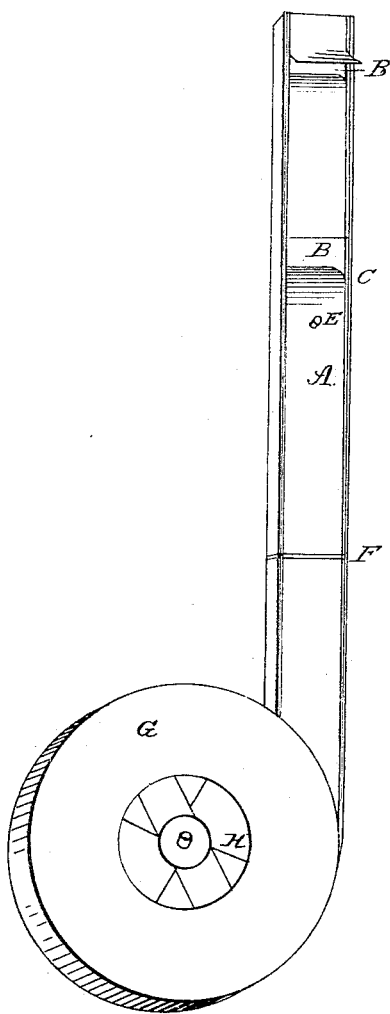
Figure 1 is a perspective view of that part of the apparatus containing the blower, and the tube containing my improvement therein.
Figure 2:
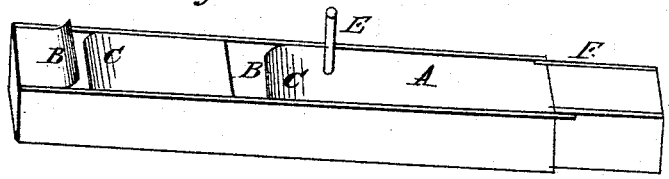
Figure 2 is a perspective view of that portion of the tube containing my said improvement.

I use the well-known wind-elevator, the blower and a part of the elevating-tube of which are seen in fig. 1.

G is the box containing the blower. H is one of the fans of the blower. A is a part of the elevating-tube, through which the grain is conveyed from the blower or aperture, through which it is introduced into the tube to the place desired, or of deposit. B is an aperture in the tube A for the admission of a current of air from the outside, and also the grain, into the tube. C is a lip, formed by a curved deflection of the upper wall of the tube A. I is the wind-guide, which serves to compress or expand, and thus regulate the current of air passing through the tube A from the blower. E is a regulating-pin, fastened to the wind-guide I, and passing through the upper wall of the tube A, by which the wind-guide is raised or depressed, as it is desired to regulate the current of air passing from the blower, and also the current of air rushing from the outside into the tube A, through the aperture B. The arrows J J indicate the direction of the current of wind from the blower, and the arrow K indicates the direction of the air rushing from the outside into the tube A, through the aperture B. F is the joint, by which the tube A is united with the box G, containing the blower or fans.

Figure 3:
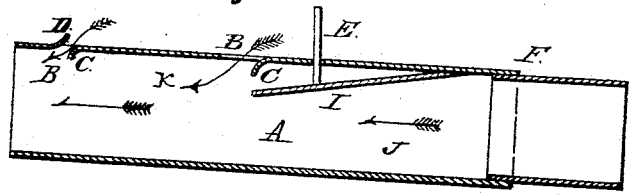
Figure 3 is a vertical sectional view of the same part, showing my improvement therein.

Another device for accomplishing the same purpose is shown in fig. 3, near the end of that part of the elevating-tube A shown in the drawings. An aperture for the admission of air from the outside is made by depressing that part of the upper wall of the tube A represented by C', and elevating that part of the same wall represented by D, the outside air rushing into the tube A in the direction of the arrow K'. And the same effect may be produced by forming a lip on the side of the tunnel or tube of the hopper, through which the grain is introduced into the elevating-tube, the said lip being on the side of the tunnel next to the blower. This lip will deflect the current of air passing through the elevating-tube from the blower, and thus produce a partial vacuum at the aperture, through which the grain passes into the elevating-tube, thus drawing a current of air from the outside through the same aperture, and forcing the grain along with it, as by the devices shown in the drawings.

The operation of my improvement above described is as follows:

The blower is put in rapid motion by the motive-power to which it is attached; this causes a strong current of wind to rush through the elevating-tube A. In passing the wind-guide I and the lip C, a partial vacuum is there produced, which causes the air from the outside to rush into the elevating-tube with great force, in the direction of the arrow K.

A hopper is placed over the aperture B, communicating with it by a tunnel or tube, through which the grain or other material is drawn, partially by its own gravitation, and with much greater force by suction, into the elevating-tube A, and thence, is forced, by the direct current generated in the blower, to the place in which it is to be deposited.

I thus avoid introducing the grain into the elevating-tube through the blower, and the injury it suffers by being broken to pieces by the fans. And by this device I am enabled to introduce, into the elevating-tube, substances which cannot be very well introduced through the blower, such as cotton, wool, rags, &c.

My said improvement also, by introducing an additional current of air into the elevating-tube, aids in drying and cooling the grain, flour, or meal, in its passage through the apparatus.

I am aware that a narrow current of air, deflectors, and oblique tributary inlets have heretofore been arranged for analogous uses, as in the patent to A. Bull, January 16, 1840, and to J. W. Clarke, July 31, 1866. This I do not claim, but, restricting myself to the precise apparatus presented,

What I claim, and desire to secure by Letters Patent, is—

The deflected lip C, and the wind-guide I, with its regulating-pin E, in combination with the aperture B, in the elevating-tube A, as and for the purposes herein described.

GERRY MORGAN.

Witnesses:
  BELA NETTLETON,
  SAMUEL BURKE.